US011056258B2

(12) United States Patent
Hirota et al.

(10) Patent No.: US 11,056,258 B2
(45) Date of Patent: Jul. 6, 2021

(54) MAGNETIC MATERIAL AND PRODUCTION METHOD THEREFOR

(71) Applicants: Panasonic Intellectual Property Management Co., Ltd., Osaka (JP); THE DOSHISHA, Kyoto (JP)

(72) Inventors: Ken Hirota, Kyoto (JP); Masaki Kato, Kyoto (JP); Junichi Kotani, Hyogo (JP); Nobuya Matsutani, Osaka (JP)

(73) Assignees: PANASONIC INTELLECTUAL PROPERTY MANAGEMENT CO., LTD., Osaka (JP); THE DOSHISHA, Kyoto (JP)

( * ) Notice: Subject to any disclaimer, the term of this patent is extended or adjusted under 35 U.S.C. 154(b) by 966 days.

(21) Appl. No.: 15/547,681

(22) PCT Filed: Jan. 28, 2016

(86) PCT No.: PCT/JP2016/000433
§ 371 (c)(1),
(2) Date: Jul. 31, 2017

(87) PCT Pub. No.: WO2016/125466
PCT Pub. Date: Aug. 11, 2016

(65) Prior Publication Data
US 2018/0033531 A1 Feb. 1, 2018

(30) Foreign Application Priority Data

Feb. 4, 2015 (JP) .............................. JP2015-020664

(51) Int. Cl.
*H01F 1/34* (2006.01)
*H01F 1/03* (2006.01)
(Continued)

(52) U.S. Cl.
CPC ......... *H01F 1/346* (2013.01); *C01G 49/0072* (2013.01); *H01F 1/344* (2013.01);
(Continued)

(58) Field of Classification Search
CPC .................................. H01F 1/344; H01F 1/346
See application file for complete search history.

(56) References Cited

U.S. PATENT DOCUMENTS 5,648,015 A * 7/1997 Reczek ................... C04B 35/26
216/22
2011/0260131 A1* 10/2011 Sonehara ............ H01L 27/2409
257/2
2016/0151836 A1 6/2016 Matsutani et al.

FOREIGN PATENT DOCUMENTS

CN 101189371 5/2008
JP 62-112907 5/1987
(Continued)

OTHER PUBLICATIONS

Office Action dated Dec. 3, 2018 in corresponding Chinese Patent Application No. 201680007779.7 (with English translation of Search Report).

(Continued)

*Primary Examiner* — Matthew E. Hoban
(74) *Attorney, Agent, or Firm* — Wenderoth, Lind & Ponack, L.L.P.

(57) ABSTRACT

A production method for a magnetic material, which is expressed by a chemical structure formula $Fe(Al_{1-x}Mn_x)_2O_4$, where $0<x<1$, and exhibits ferromagnetism, includes: preparing a mixed aqueous solution by dissolving, in distilled water, Fe nitrate, Al nitrate, and an oxide including Mn, the Fe nitrate, the Al nitrate, and the oxide being parent materials; preparing a metal-citric acid complex by mixing citric acid and ethylene glycol with the mixed aqueous solution; obtaining a precursor by boiling the metal-citric acid com-
(Continued)

plex to a gel and drying the gel; and obtaining the magnetic material by sintering the precursor.

12 Claims, 15 Drawing Sheets

(51) Int. Cl.
    *C01G 49/00*     (2006.01)
    *H01F 41/02*     (2006.01)

(52) U.S. Cl.
    CPC ...... *H01F 41/0246* (2013.01); *C01P 2002/32* (2013.01); *C01P 2002/72* (2013.01); *C01P 2004/03* (2013.01); *C01P 2006/42* (2013.01)

(56) References Cited

FOREIGN PATENT DOCUMENTS

| WO | 2007/092021 | 8/2007 |
|---|---|---|
| WO | 2015/019576 | 2/2015 |

OTHER PUBLICATIONS

International Search Report dated Apr. 19, 2016 in corresponding International Application No. PCT/JP2016/000433.

* cited by examiner

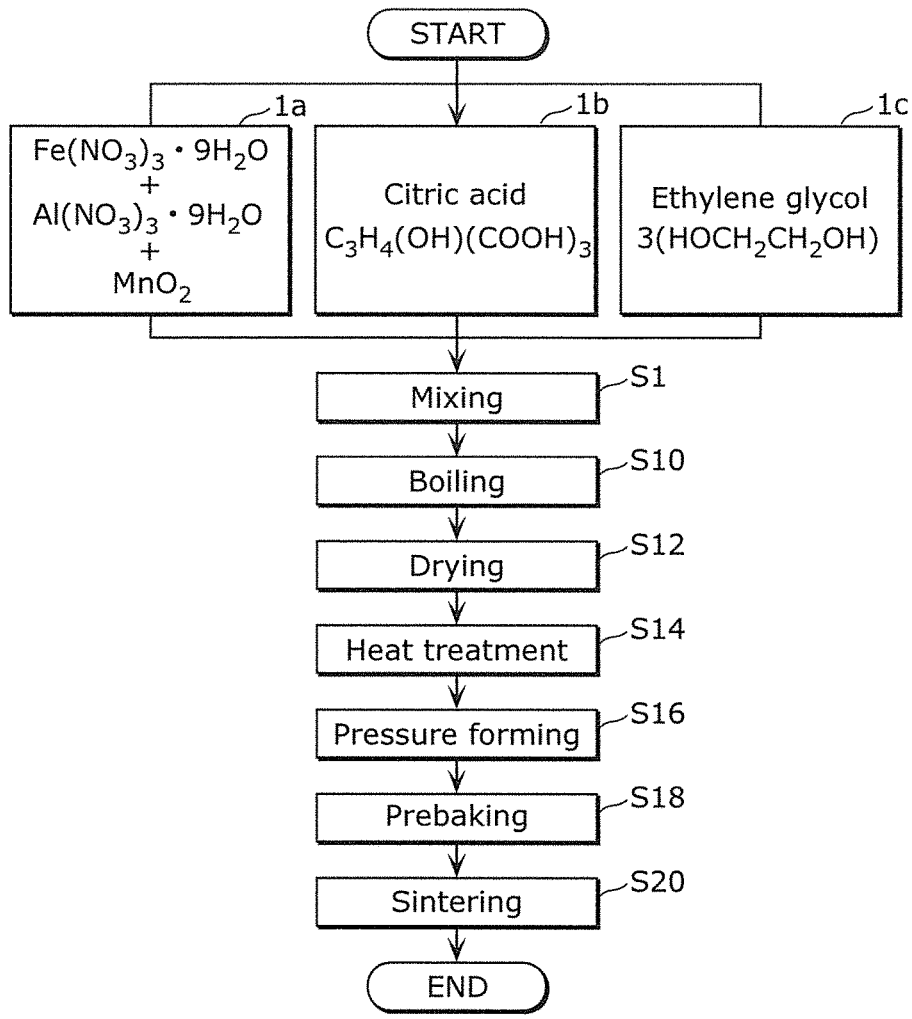
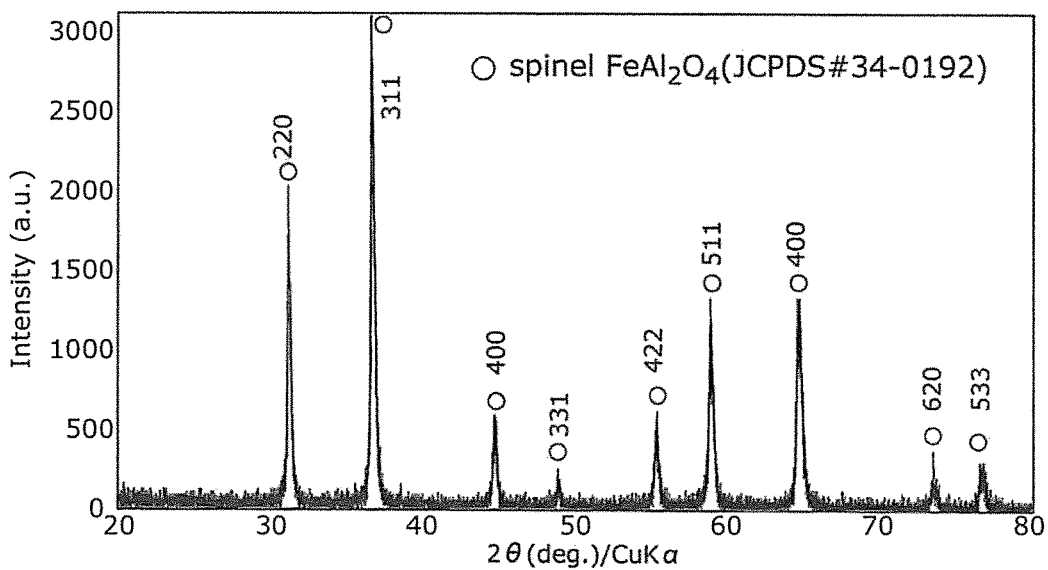

FIG. 9A

| x \ a | 0.0 | 0.2 | 0.4 | 0.5 | 0.6 | 0.7 | 0.8 | 0.9 |
|---|---|---|---|---|---|---|---|---|
| 0.08 | S | S | S, $Fe_3O_4$, MnO | S, $Fe_3O_4$, MnO | S, MnO | | S, MnO | |
| 0.05 | S | S | S, $Fe_3O_4$ | S, $Fe_3O_4$, MnO | S, MnO | | S, MnO | |
| 0.03 | S | S, $Fe_3O_4$, $\alpha\text{-}Al_2O_3$ | S, $Fe_3O_4$, $\alpha\text{-}Al_2O_3$ | S, $Fe_3O_4$, MnO | S, MnO | | S, MnO | |
| 0.01 | S | $Fe_3O_4$, $\alpha\text{-}Al_2O_3$ | S, $Fe_3O_4$, $\alpha\text{-}Al_2O_3$ | S, $Fe_3O_4$ | S | S | S | S |
| 0 (100% $N_2$) | S | $Fe_3O_4$, $\alpha\text{-}Al_2O_3$ | S, $Fe_3O_4$, $\alpha\text{-}Al_2O_3$ | S, $Fe_3O_4$, MnO | S | S | S | S |

| x | 0.0 | 0.2 | 0.6 | 0.7 | 0.8 | 0.9 |
|---|---|---|---|---|---|---|
| Density Dobs (g /cm$^3$) | 4.274 | 4.381 | 4.652 | 4.749 | 4.818 | 4.869 |
| BET specific surface area (m$^2$/g) | 15.6 | 5.10 | 5.21 | 2.79 | 2.00 | |
| BET-particle size (m m) | 0.09 | 0.27 | 0.25 | 0.45 | 0.62 | |
| SEM-particle size (μm) | 0.06 | 0.08 | 0.10 | | 0.17 | |
| Measured mass (g) | 0.17582 | 0.24056 | 0.24660 | 0.26879 | 0.28499 | 0.29686 |
| $H_C$ (Oe) | | 250 | 18 | 14.4 | 14.0 | 15.3 |
| log $H_C$ (Oe) | | 2.40 | 1.26 | 1.16 | 1.15 | 1.18 |
| Mass magnetic susceptibility $\sigma_s$ (emu/g) | | 2.5 | 10.9 | 12.3 | 16.2 | 17.5 |
| Magnetic susceptibility (emu) | | 0.60 | 2.66 | 3.31 | 4.62 | 5.20 |
| $I_s$ (Wb/m$^2$) | | 0.014 | 0.063 | 0.073 | 0.098 | 0.107 |
| Saturation magnetic flux density $B$(T) | | 0.014 | 0.063 | 0.073 | 0.098 | 0.107 |

MAGNETIC MATERIAL AND PRODUCTION METHOD THEREFOR

The present disclosure relates to a ferrite magnetic material which is ferromagnetic, and a production method therefor.

BACKGROUND ART

Conventionally, development of a magnetic material having high magnetic permeability μ in a high-frequency region has been expected. In recent years, a ferrite has attracted attention as such a material.

A ferrite is a ceramic mainly composed of iron oxide, and examples of the ferrite include $Mg(Fe_{1-x}Mn_x)_2O_4$, $FeAl_2O_4$ (hercynite), and the like. Moreover, ferrites are divided into a magnetic substance exhibiting magnetism and a non-magnetic substance exhibiting no magnetism. The magnetic substance, especially a ferromagnetic ferrite, is applied in various fields such as inductors for high frequency, magnetic cores for transformers, and black pigment powder for application. (See Patent Literature (PTL) 1, for example.)

PTL 1 discloses a ceramic burner as a technique using a ferrite.

CITATION LIST

Patent Literature

[PTL 1] Japanese Unexamined Patent Application Publication No. S62-112907

SUMMARY OF INVENTION

Technical Problem

PTL 1 discloses, as a material of the ceramic burner, a ferrite having a spinel structure of $MgAl_2O_4$, $FeAl_2O_4$, $CoAl_2O_4$, or the like. The use of hercynite $FeAl_2O_4$, which is composed of Fe and Al, is sometimes especially desired depending on fields in which the ferrite is used.

However, hercynite $FeAl_2O_4$ is a non-magnetic substance, and thus cannot be used when it is desired to use the magnetic properties of the ferrite. In response, it has been desired to develop a magnetic material which is composed of Fe and Al and has high magnetic properties.

In view of the above problem, the present invention has an object to provide a magnetic material having high magnetic properties, and a production method therefor.

Solution to Problem

A magnetic material according to one aspect of the present disclosure is a magnetic material expressed by a chemical structure formula $Fe(Al_{1-x}Mn_x)_2O_4$, where $0<x<1$, and exhibits ferromagnetism.

Advantageous Effects of Invention

According to the present disclosure, it is possible to provide a magnetic material having high magnetic properties, and a production method therefor.

BRIEF DESCRIPTION OF DRAWINGS

FIG. 1 is a flow chart illustrating a production process of $Fe(Al_{1-x}Mn_x)_2O_4$ according to an embodiment.

FIG. 2 is a graph illustrating an X-ray diffraction pattern of $Fe(Al_{1-x}Mn_x)_2O_4$ in the case x=0.

FIG. 9A is a table summarizing products when a value of x and a content rate of $H_2$ are changed.

Figure 3:
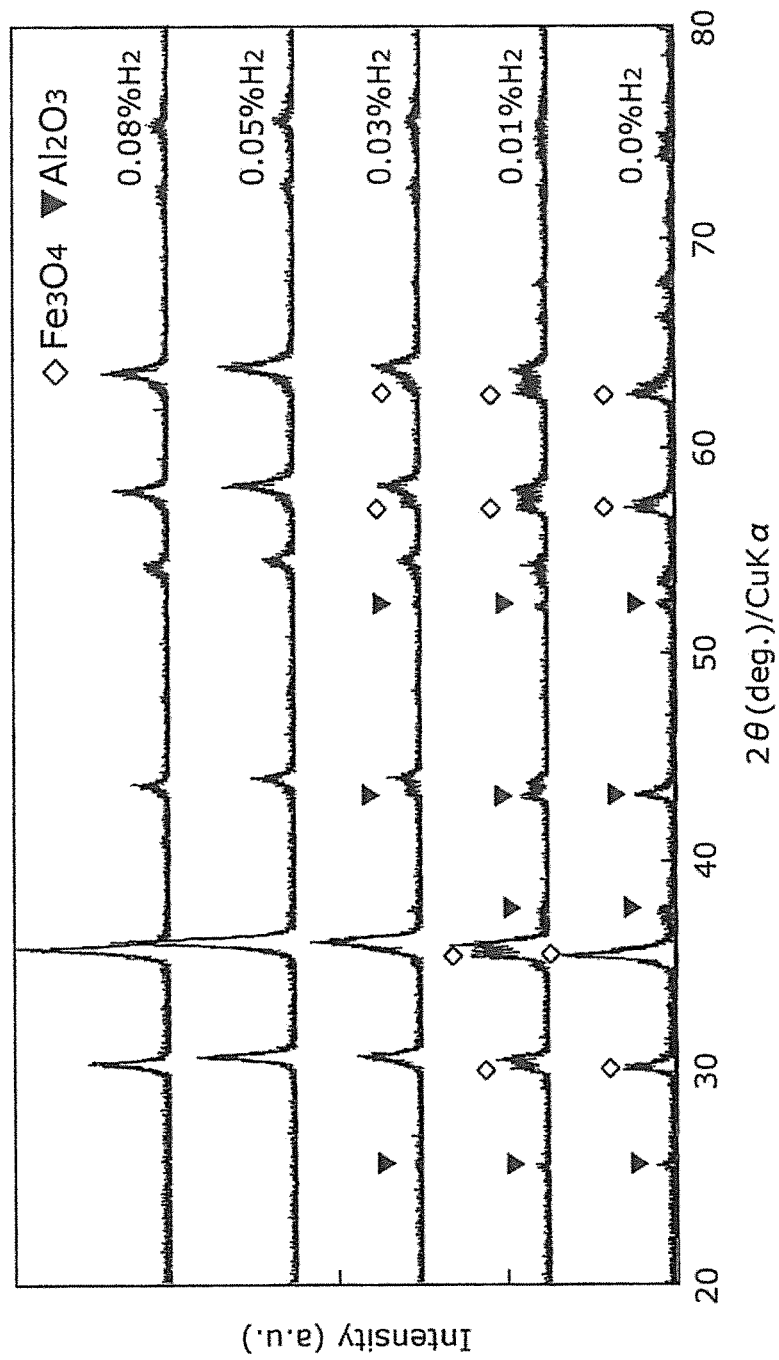
FIG. 3 is a graph illustrating an X-ray diffraction pattern of a product treated with heat under each of various gas atmospheres in the case x=0.2.

DESCRIPTION OF EMBODIMENTS (Underlying Knowledge Forming Basis of the Present Disclosure)

The underlying knowledge forming the basis of the present disclosure will be described prior to describing embodiments of a magnetic material and a production method therefor according to the present disclosure.

As stated above, hercynite $FeAl_2O_4$, a type of ferrite, is a non-magnetic substance and exhibits no ferromagnetism. In order to produce a magnetic material exhibiting high magnetic properties, the inventors of the present application have tried to develop a ferrite magnetic material which exhibits ferromagnetism and has a new composition, by adding Mn, as the fourth element other than Fe, Al, and O, to hercynite $FeAl_2O_4$. The inventors, however, have found out that it is difficult to prepare a powder using the conventional solid reaction method, sol-gel method, and citric acid gel method, and it is not possible to synthesize such a complex magnetic material. The inventors have gained the following knowledge from these experimental results.

When the structure of ferrite is expressed as $AB_2O_4$ (where A and B are elements), ferrite having a new composition is expressed as $Fe(Al_{1-x}Mn_x)_2O_4$. In hercynite $FeAl_2O_4$, Fe in A site is divalent and Al in B site is trivalent. Accordingly, in ferrite having the new composition, Fe in A site must be divalent and Mn in B site must be trivalent.

Here, to produce hercynite $FeAl_2O_4$ using the solid reaction method, it is assumed that after $\alpha$-$Fe_2O_3$($Fe^{3+}$) and fine $\gamma$-$Al_2O_3$ as parent materials are evenly mixed, $\alpha$-$Fe_2O_3$ ($Fe^{3+}$) and $\gamma$-$Al_2O_3$ are heat-treated at 900° C. in $N_2$ gas containing a little less than 1% of $H_2$, $Fe^{3+}$ is reduced to $Fe^{2+}$, and $FeAl_2O_4$ is synthesized. If, however, the solid reaction method is applied to ferrite $Fe(Al_{1-x}Mn_x)_2O_4$ having a new composition, Mn in Mn oxide, a raw material, is reduced to $Mn^{2+}$ and is thus placed in A site. Accordingly, it is difficult to obtain $Fe(Al_{1-x}Mn_x)_2O_4$ in which part of Al in B site of $Fe(Al_{1-x}Mn_x)_2O_4$ is replaced with Mn.

Moreover, with the sol-gel method which uses the hydrolysis of metal alkoxide, and the citric acid gel method which forms a metal complex by adding citric acid and ethylene glycol to a mixed aqueous solution of metal nitrate, then removes organic components by heating the metal complex in the atmosphere, and finally synthesizes a powder by further heating the metal complex at high temperature, it is difficult to control a heat treatment atmosphere which allows $Fe^{2+}$ and $Mn^{3+}$ to be simultaneously present, and to obtain targeted ferrite $Fe(Al_{1-x}Mn_x)_2O_4$ having a new composition.

In view of this, a magnetic material according to one aspect of the present disclosure is a magnetic material expressed by a chemical structure formula $Fe(Al_{1-x}Mn_x)_2O_4$, where $0<x<1$, and exhibits ferromagnetism.

With this configuration, it is possible to provide a magnetic material having high magnetic properties.

Moreover, a range of a value of mass magnetic susceptibility $\sigma_s$ [emu/g] of the magnetic material may be expressed as $\sigma_s \geq 10$.

With this configuration, it is possible to obtain a magnetic material suitable as a material of a device which is required to have high magnetic properties.

Moreover, a range of a value of x may be expressed as $x \geq 0.2$.

With this configuration, it is possible to obtain a magnetic material suitable as a material of a device which is required to have high magnetic properties.

Moreover, the magnetic material comprises manganese dioxide $MnO_2$ as a raw material.

With this configuration, it is possible to place Mn in the same site as a site in which Al of hercynite $FeAl_2O_4$ is placed, it is possible to easily synthesize a ferrite magnetic material expressed by the chemical structure formula $Fe(Al_{1-x}Mn_x)_2O_4$.

Moreover, a production method for a magnetic material according to one aspect of the present disclosure is a production method for a magnetic material, which is expressed by a chemical structure formula $Fe(Al_{1-x}Mn_x)_2O_4$, where $0<x<1$, and exhibits ferromagnetism, the production method including: preparing a mixed aqueous solution by dissolving, in distilled water, Fe nitrate, Al nitrate, and an oxide including Mn, the Fe nitrate, the Al nitrate, and the oxide being parent materials; preparing a metal-citric acid complex by mixing citric acid and ethylene glycol with the mixed aqueous solution; obtaining a precursor by boiling the metal-citric acid complex to a gel and drying the gel; and obtaining the magnetic material by sintering the precursor.

With this configuration, it is possible to provide a magnetic material having high magnetic properties.

Moreover, in the obtaining of the magnetic material, a trivalent Fe ion and a tetravalent Mn ion may be reduced to a divalent Fe ion and a trivalent Mn ion, respectively.

With this configuration, it is possible to place Mn in the same site as a site in which Al of hercynite $FeAl_2O_4$ is placed, it is possible to easily synthesize a ferrite magnetic material expressed by the chemical structure formula $Fe(Al_{1-x}Mn_x)_2O_4$.

Moreover, the Fe nitrate may be iron(III) nitrate nonahydrate $Fe(NO_3)_3 \cdot 9H_2O$, the Al nitrate may be aluminum(III) nitrate nonahydrate $Al(NO_3)_3 \cdot 9H_2O$, and the oxide including Mn may be manganese dioxide $MnO_2$.

With this configuration, it is possible to place Mn in the same site as a site in which Al of hercynite $FeAl_2O_4$ is placed, it is possible to easily synthesize a ferrite magnetic material expressed by the chemical structure formula $Fe(Al_{1-x}Mn_x)_2O_4$.

Moreover, in the preparing of the metal-citric acid complex, a molar ratio among a metal ion, the citric acid, and the ethylene glycol in the mixed aqueous solution may be 1:3:9.

With this configuration, it is possible to easily synthesize a ferrite magnetic material expressed by a chemical structure formula $Fe(Al_{1-x}Mn_x)_2O_4$ of a single phase.

Hereinafter, embodiments will be described in detail with reference to the drawings.

It is to be noted that the embodiments described below each show a specific example of the present disclosure. The numerical values, shapes, materials, structural elements, the arrangement and connection of the structural elements, steps, order of the steps, etc. indicated in the following embodiments are mere examples, and therefore are not intended to limit the present disclosure. Moreover, among the structural elements in the following embodiments, structural elements not recited in any of the independent claims indicating the broadest inventive concepts are described as optional elements.

Embodiment

[1. Definitions of Terms]

First, the definitions of terms used in an embodiment will be provided.

A citric acid gel method (or polymerized complex method) is defined as the following material production method. First, a stable chelate complex (metal-citric acid complex) is produced using various types of metal ions and citric acid. Ethylene glycol is added to the metal-citric acid complex, and the metal-citric acid complex is dissolved and dispersed in ethylene glycol. Ethylene glycol in which the metal-citric acid complex is dispersed is esterified by heating and polymerization, and the metal-citric acid complex (polymer metal complex) is evenly trapped in polyester. In other words, ethylene glycol is added to the metal-citric acid complex and esterified by heating and polymerization to obtain a gel. Subsequently, the gelled metal-citric acid complex is calcined (prebaked and baked) to synthesize an oxide, that is, a targeted substance.

The network structure of the polymer metal complex obtained by the citric acid gel method (or polymerized complex method) is formed mainly by ester polymerization and copolymerization, and is chemically stable. Accordingly, the mobility of metal ions is low, and provided is an operation advantage of reducing aggregation or segregation of metal elements in a subsequent calcination stage.

A solid phase method is defined as the following material production method. Various types of raw material powders to be parent materials are weighed in at a predetermined amount, and mixed. After the mixing, the mixture is first temporarily baked and then baked. Accordingly, a targeted substance is synthesized. It is to be noted that the solid phase method is also referred to as a solid reaction method.

A lattice parameter is one of parameters used as crystal data, and a significant element for identifying a substance. Lattice parameters are represented by lengths a, b, c of the sides of a unit lattice in a crystal lattice and angles $\alpha$, $\beta$, $\gamma$ between the sides.

Moreover, application of a magnetic field to a magnetic substance causes a magnetic moment to orient to a magnetic field direction, which results in magnetization. In other words, magnetization is referred to causing a magnetic moment to point to one direction by applying a magnetic field to a magnetic substance. Moreover, the magnetizing properties of a magnetic substance are generally irreversible and change curvilinearly. Such irreversible characteristics of the magnetic substance are referred to as hysteresis.

Moreover, the magnetic moment of a magnetized substance is also referred to as magnetic susceptibility [emu]. In this case, the magnetic susceptibility is represented by a vector and indicates the intensity of magnetization. A magnetic moment per unit volume is referred to as bulk magnetic susceptibility [emu/cm$^3$], and a magnetic moment per unit mass is referred to as mass magnetic susceptibility [emu/g]. These indicate the intensity of magnetization. It is to be noted that mass magnetic susceptibility $\sigma_s$ may be simply referred to as "magnetic susceptibility" in the embodiment described below.

Moreover, the intensity of magnetization when a magnetic field is applied to a magnetic substance until the magnetic field is saturated is referred to as saturation magnetic susceptibility J.

Moreover, magnetic flux density B[T] refers to surface density of magnetic flux per unit area, and may be simply referred to as a magnetic field strength. In addition, magnetic flux density B corresponding to saturation magnetic susceptibility $J_s$ is referred to as saturation magnetic flux density $B_s$[T]. It is to be noted that regarding saturation magnetic flux density $B_s$, a point at which the intensity of magnetization reaches saturation is referred to as S point.

Removal of the magnetic field after saturation magnetization does not cause the intensity of the magnetization to be zero due to hysteresis, and magnetization having a certain intensity remains. The intensity of the magnetization is referred to as residual magnetization $J_r$. Furthermore, application of a reverse magnetic field to a magnetic substance in a state of residual magnetization causes the intensity of magnetization in an applied magnetic field having a certain intensity to be zero. The intensity of the magnetic field at this time is referred to as coercivity $H_c$ [Oe]. A substance having a small coercivity is referred to as a soft magnetic material. In contrast, a substance having a high coercivity is referred to as a hard magnetic material (e.g., a permanent magnet). The value of coercivity greatly changes depending on a magnetic material.

Magnetic permeability $\mu$ refers to an index indicating how easily a magnetic flux passes through a magnetic material, that is, the degree of a magnetic flux variation when a magnetic field having a certain intensity is applied. The magnetic permeability indicates ease of magnetization, and is one of factors for evaluating the characteristics of a magnetic substance.

Like the magnetic permeability, an index indicating a relationship between a magnetic field and magnetization is referred to as magnetic susceptibility (magnetizability). Generally, magnetic susceptibility X is defined with the following equation.

$$X=J/H$$

Here, H represents a magnetic field, and 3 represents the intensity of magnetization. As expressed by the above equation, when a magnetic field affects a magnetic substance, the magnetization is a function of the magnetic field.

Moreover, a material having high permeable characteristics by which a higher magnetic flux density is induced by applying a slight magnetic field from outside is referred to as a highly magnetic permeable material or soft magnetic material. A highly magnetic permeable material is required to have a high magnetic permeability $\mu$, a low coercivity $H_c$, and a high saturation magnetic flux density $B_s$, and have a small loss. Ferrite as a soft magnetic material, an oxide, generally has a high electrical resistance, and can be usually used for high frequency.

[2. Composition of Ferrite $Fe(Al_{1-x}Mn_x)_2O_4$]

A magnetic material according to the embodiment is ferrite $Fe(Al_{1-x}Mn_x)_2O_4$, an oxide containing Fe, Al, and Mn.

The structure of ferrite can be generally represented as $AB_2O_4$ (where A and B are any metal elements.). Ferrite according to the embodiment has a structure in which Fe is in A site and Al and Mn are in B site, and a composition in which part of Al in B site of hercynite $FeAl_2O_4$, known as a type of ferrite, is replaced with Mn.

Ferrite $Fe(Al_{1-x}Mn_x)_2O_4$ according to the embodiment not only has the same characteristics as hercynite containing Fe and Al as components, but also has ferromagnetism that hercynite lacks.

[3. Production Method for Ferrite $Fe(Al_{1-x}Mn_x)_2O_4$]

Hereinafter, a production method for ferrite $Fe(Al_{1-x}Mn_x)_2O_4$ according to the embodiment will be described.

The production method for ferrite $Fe(Al_{1-x}Mn_x)_2O_4$ according to the embodiment is obtained by modifying the aforementioned citric acid gel method. In the citric acid gel method, the following are used: iron(III) nitrate nonahydrate $Fe(NO_3)_3 \cdot 9H_2O$ and aluminum(III) nitrate nonahydrate $Al(NO_3)_3 \cdot 9H_2O$, metal nitrate, as sources of metal elements of ferrite $Fe(Al_{1-x}Mn_x)_2O_4$; and manganese(II) nitrate hexahydrate $Mn(NO_3)_2 \cdot 6H_2O$ as a source of Mn.

In contrast, in the production method for ferrite $Fe(Al_{1-x}Mn_x)_2O_4$ according to the embodiment, the following are used: iron(III) nitrate nonahydrate $Fe(NO_3)_3 \cdot 9H_2O$ and aluminum(III) nitrate nonahydrate $Al(NO_3)_3 \cdot 9H_2O$, metal nitrate, as sources of metal elements of ferrite $Fe(Al_{1-x}Mn_x)_2O_4$. In addition, manganese dioxide $MnO_2$ ($Mn^{4+}$) is used as a source of Mn. Specifically, a mixed aqueous solution is prepared by evenly mixing fine particles of manganese dioxide $MnO_2$ with a nitrate aqueous solution in which iron(III) nitrate nonahydrate $Fe(NO_3)_3 \cdot 9H_2O$ and aluminum(III) nitrate nonahydrate $Al(NO_3)_3 \cdot 9H_2O$ are mixed.

Moreover, citric acid and ethylene glycol are mixed with the mixed aqueous solution, and the mixed aqueous solution is treated with heat under each of various gas atmospheres after organic components are removed. With this, $Fe(Al_{1-x}Mn_x)_2O_4$ is synthesized by reducing trivalent Fe ions $Fe^{3+}$ and tetravalent Mn ions $Mn^{4+}$ to divalent Fe ions $Fe^{2+}$ and trivalent Mn ions $Mn^{3+}$, respectively. It is to be noted that hereinafter, ferrite $Fe(Al_{1-x}Mn_x)_2O_4$, a new material, is simply shown as $Fe(Al_{1-x}Mn_x)_2O_4$, iron(III) nitrate nonahydrate $Fe(NO_3)_3 \cdot 9H_2O$ is simply shown as $Fe(NO_3)_3 \cdot 9H_2O$, aluminum(III) nitrate nonahydrate $Al(NO_3)_3 \cdot 9H_2O$ is simply shown as $Al(NO_3)_3 \cdot 9H_2O$, and manganese dioxide $MnO_2$ is simply shown as $MnO_2$.

Hereinafter, the production method will be described in details.

FIG. 1 is a flow chart illustrating a production process of a ferrite magnetic material according to the embodiment.

As illustrated in FIG. 1, first, a solution $1a$, a solution $1b$, and a solution $1c$ are prepared.

The solution $1a$ contains, as parent materials, $Fe(NO_3)_3 \cdot 9H_2O$ and $Al(NO_3)_3 \cdot 9H_2O$, metal nitrate, and $MnO_2$ as a source of Mn. Both $Fe(NO_3)_3 \cdot 9H_2O$ and $Al(NO_3)_3 \cdot 9H_2O$ contain $H_2O$, and are thus soluble and mixable. In addition, Fe in $Fe(NO_3)_3 \cdot 9H_2O$ and Al in $Al(NO_3)_3 \cdot 9H_2O$ become ions in an aqueous solution, and are present as $Fe^{3+}$ and $Al^{3+}$. Fe and Al are evenly dispersed in the aqueous solution by being ionized. It is to be noted that it is desirable that to make $MnO_2$ dispersible in an aqueous solution, particulate powder $MnO_2$ having a diameter of at most 0.5 μm be used.

The solution $1b$ is a citric acid $C_3H_4(OH)(COOH)_3$ solution. It is to be noted that citric acid used here may be anhydrous citric acid ($C(CH_2COOH)_2(OH)(COOH)$) or citric acid monohydrate $C_6H_8O_7 \cdot H_2O$.

The solution $1c$ is an ethylene glycol $HOCH_2CH_2OH$ solution.

Next, the solution $1a$, the solution $1b$, and the solution is are mixed (step S1). It is desirable that where a total number of moles of metal ions contained in the solution $1a$ is 1, a mixture ratio between the solution $1b$ and the solution is be 3 to 9.

Subsequently, a mixed solution obtained by mixing the solution $1a$, the solution $1b$, and the solution $1c$ is boiled at 120° C. for 48 hours (step S10). At this time, the mixed solution containing the solution $1a$, the solution $1b$, and the solution $1c$ is heated while being stirred. Consequently, the mixed solution containing the solution $1a$, the solution $1b$, and the solution $1c$ is gelled.

Next, the gelled mixed solution is dried at 25° C. in an atmosphere for 12 hours. As a result, a precursor of $Fe(Al_{1-x}Mn_x)_2O_4$ is formed (step S12).

Next, the dried precursor of $Fe(Al_{1-x}Mn_x)_2O_4$ is treated with heat (step S14). The heat treatment is performed at 300° C. in an atmosphere for 12 hours. Consequently, organic components in the precursor are removed. It is to be noted that the precursor after the heat treatment is amorphous.

Subsequently, the precursor of $Fe(Al_{1-x}Mn_x)_2O_4$ is prebaked and crystallized. Examples of the prebaking include atmospheric heat treatment.

Specifically, first, the heat-treated precursor of $Fe(Al_{1-x}Mn_x)_2O_4$ is put into a mold and compressed. At this time, uniaxial pressing is performed with a constant pressure of 98 Mpa (step S16).

Next, the compressed precursor of $Fe(Al_{1-x}Mn_x)_2O_4$ is prebaked at 900° C. for two hours. At this time, the compressed precursor of $Fe(Al_{1-x}Mn_x)_2O_4$ is calcined while $N_2$ gas containing $H_2$ gas at a predetermined rate is being released (step S18). The rate a % of $H_2$ gas is, for example, a=0, 0.01, 0.03, 0.05, 0.08, 0.1. In consequence, the amorphous precursor of $Fe(Al_{1-x}Mn_x)_2O_4$ is crystallized. At this time, trivalent Fe ions $Fe^{3+}$ is reduced to divalent Fe ions $Fe^{2+}$, and tetravalent Mn ions $Mn^{4+}$ is reduced to trivalent Mn ions $Mn^{3+}$. Accordingly, the trivalent Mn ions $Mn^{3+}$ are allowed to be placed in B site in the structure of ferrite expressed by a generic chemical structure formula $AB_2O_4$ (where A and B are any metal elements). As a result, trivalent ions $Al^{3+}$ and $Mn^{3+}$ are placed in B site. Ferrite $Fe(Al_{1-x}Mn_x)_2O_4$ powder having the composition in which part of Al in hercynite $FeAl_2O_4$ is replaced with Mn is obtained through the above steps.

Subsequently, the ferrite $Fe(Al_{1-x}Mn_x)_2O_4$ powder is sintered (step S20). It is to be noted that examples of sintering include atmospheric heat treatment to be performed after a prebaked precursor is formed by uniaxial pressing again, hot pressing, and the like. Here, the hot pressing refers to a method for placing a powder or a preformed material in a mold and pressure sintering the powder or the preformed material while heating the powder or the preformed material at high temperature. The hot pressing makes it possible to not only provide a closely-packed sintered body having a density close to a theoretical density, but also control the microstructure of a sintered body. Accordingly, the hot pressing makes it possible to form a sintered body having superior mechanical and physical properties, such as a high-strength sintered body. In addition, the hot pressing is characterized by improving an interfacial contact between different materials, binding crystals or different materials, and the like. The present disclosure is not limited to these methods, and another method for sintering $Fe(Al_{1-x}Mn_x)_2O_4$ powder may be used. Moreover, the temperatures and times in the aforementioned steps are mere examples, and other temperatures and times may be used.

Various kinds of $Fe(Al_{1-x}Mn_x)_2O_4$ powders were produced using the aforementioned production method while the value of x in $Fe(Al_{1-x}Mn_x)_2O_4$ was being changed. The value of x was set to be one of seven values as x=0, 0.2, 0.4, 0.5, 0.6, 0.7, 0.8. Moreover, the following evaluation was performed regarding the crystal structure and magnetic properties of each $Fe(Al_{1-x}Mn_x)_2O_4$ powder resulting from prebaking and synthesizing.

[4. Evaluation of Crystal Structure of Ferrite $Fe(Al_{1-x}Mn_x)_2O_4$]

As stated above, an evaluation was performed regarding the crystal structure of each $Fe(Al_{1-x}Mn_x)_2O_4$ in the case where the value of x was changed as x=0, 0.2, 0.4, 0.5, 0.6, 0.7, 0.8.

Figure 6:
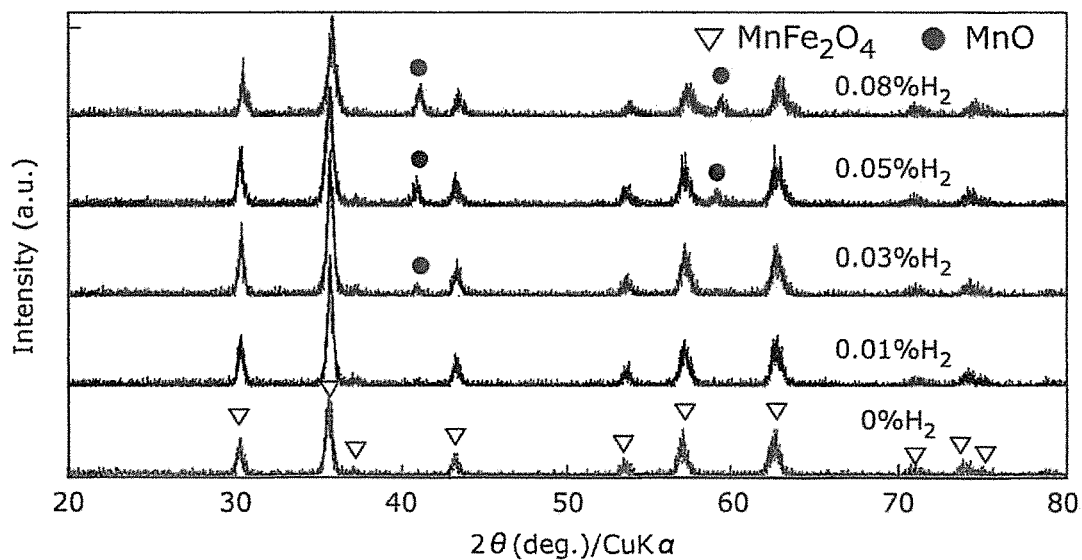
FIG. 6 is a graph illustrating an X-ray diffraction pattern of a product treated with heat under each of various gas atmospheres in the case x=0.6.
Figure 7:
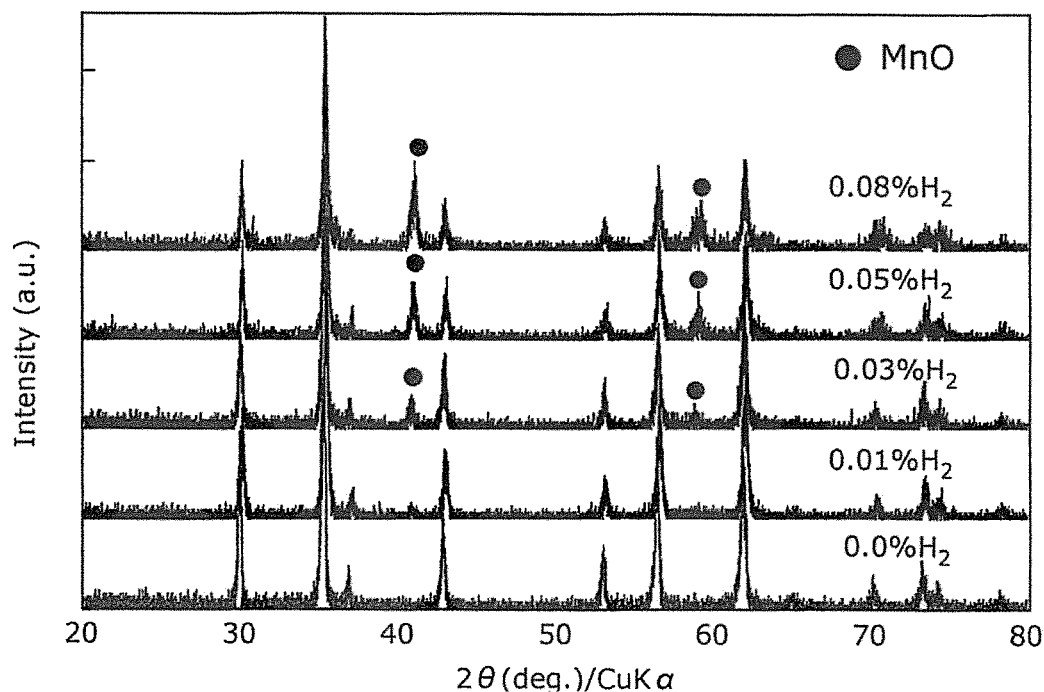
FIG. 7 is a graph illustrating an X-ray diffraction pattern of a product treated with heat under each of various gas atmospheres in the case x=0.8.
Figure 8:
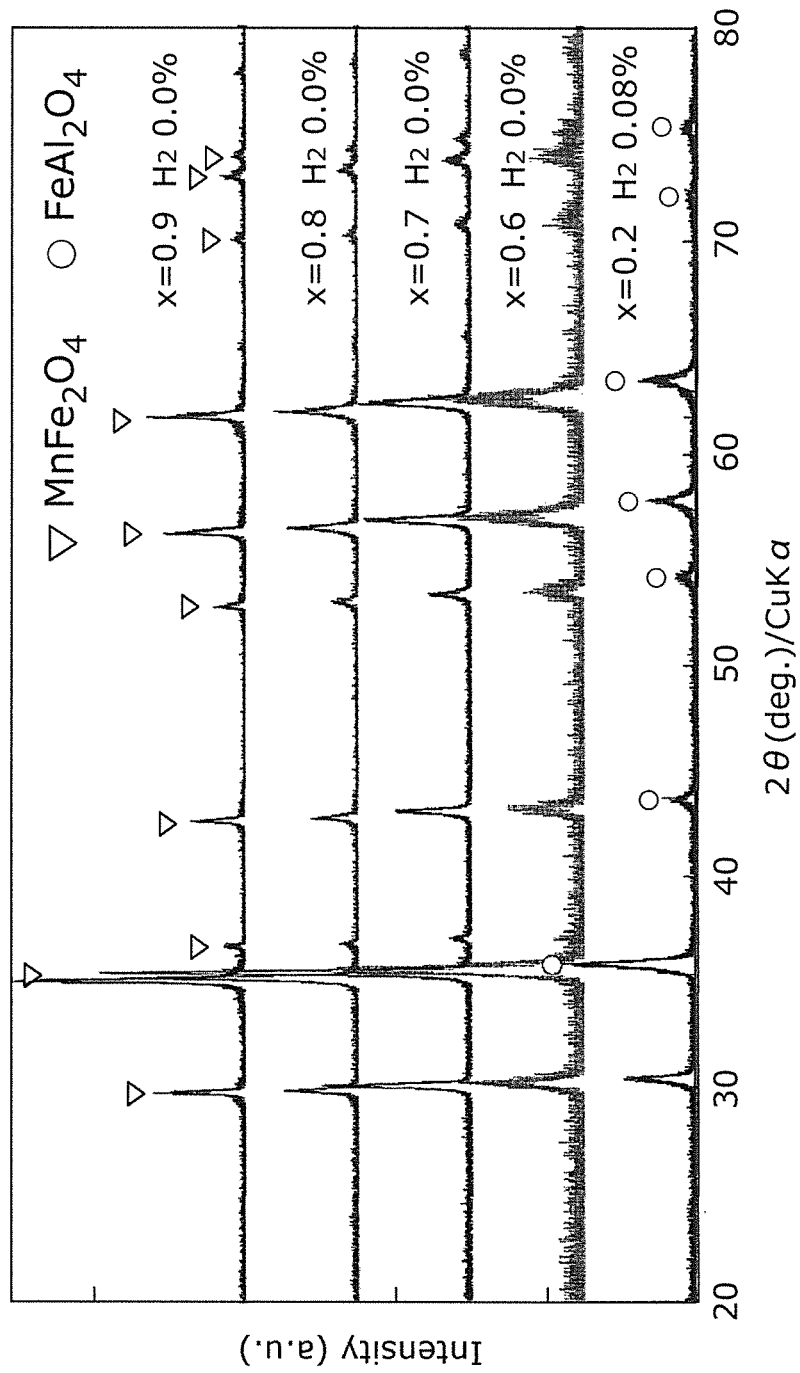
FIG. 8 is a graph illustrating an X-ray diffraction pattern of a product obtained under each of gas atmospheres generated by $Fe(Al_{1-x}Mn_x)_2O_4$ indicating a spinel structure.

FIG. 2 to FIG. 7 each are a graph illustrating an X-ray diffraction pattern of a product obtained by heat-treating a powder corresponding to a composition x=0, 0.2, 0.4, 0.5, 0.6, 0.7, 0.8, under each of various gas atmospheres. FIG. 8 is a graph illustrating gas atmospheres and X-ray diffraction patterns of $Fe(Al_{1-x}Mn_x)_2O_4$ whose crystal structure has become a spinel-type crystal structure after heat treatment, in the case x=0, 0.2, 0.4, 0.5, 0.6, 0.7, 0.8.

$Fe(Al_{1-x}Mn_x)_2O_4$ in the case x=0 corresponds to $FeAl_2O_4$ (hercynite). As illustrated in FIG. 2, the X-ray diffraction pattern of $Fe(Al_{1-x}Mn_x)_2O_4$ in the case x=0 matched the X-ray diffraction pattern of $FeAl_2O_4$ having a spinel-type crystal structure.

In the case x=0.2, $Fe(Al_{1-x}Mn_x)_2O_4$ was produced while a rate a % of $H_2$ gas flowing into $N_2$ gas atmosphere was being changed as a=0, 0.01, 0.03, 0.05, 0.08 in the prebaking step. As illustrated in FIG. 3, in the case a=0, 0.01, 0.03, peak patterns were observed which matched the X-ray diffraction patterns of spinel-type $Fe(Al_{1-x}Mn_x)_2O_4$, $Al_2O_3$, and $Fe_3O_4$. Accordingly, it was confirmed that $Al_2O_3$ and $Fe_3O_4$ had been produced other than $Fe(Al_{1-x}Mn_x)_2O_4$. Moreover, in the case a=0.05, 0.08, peak patterns were observed which matched the X-ray diffraction patterns of spinel-type $Fe(Al_{1-x}Mn_x)_2O_4$. Accordingly, it was confirmed that $Fe(Al_{1-x}Mn_x)_2O_4$ powders of the spinel type had been synthesized.

Figure 4:
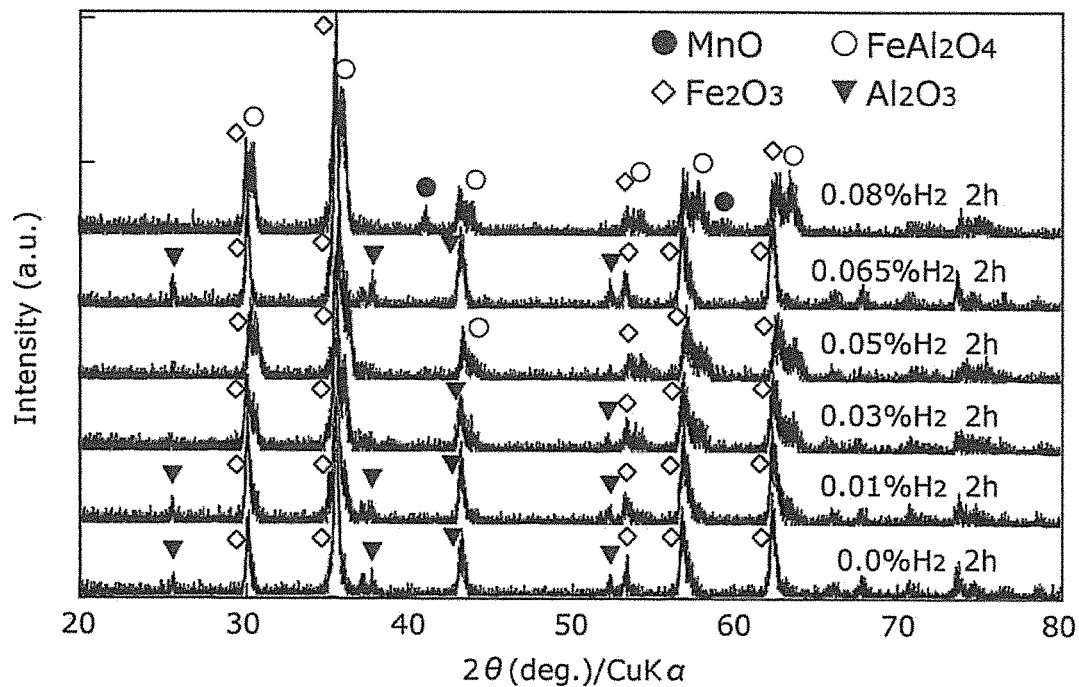
FIG. 4 is a graph illustrating an X-ray diffraction pattern of a product treated with heat under each of various gas atmospheres in the case x=0.4.

In the case x=0.4, $Fe(Al_{1-x}Mn_x)_2O_4$ was synthesized while a rate a % of $H_2$ gas included in $N_2$ gas was being changed as a=0, 0.01, 0.03, 0.05, 0.065, 0.08 in the prebaking step. As illustrated in FIG. 4, in the case a=0, 0.01, 0.03, 0.065, peak patterns were observed which matched the X-ray diffraction patterns of spinel-type $Fe(Al_{1-x}Mn_x)_2O_4$, $Al_2O_3$, and $Fe_2O_3$. Accordingly, it was confirmed that $Al_2O_3$ and $Fe_2O_3$ had been produced other than $Fe(Al_{1-x}Mn_x)_2O_4$. Moreover, in the case a=0.05, peak patterns were observed which matched the X-ray diffraction patterns of spinel-type $Fe(Al_{1-x}Mn_x)_2O_4$, $Fe_2O_3$, and $FeAl_2O_4$. Accordingly, it was confirmed that $Fe_2O_3$ and $FeAl_2O_4$ had been produced other than $Fe(Al_{1-x}Mn_x)_2O_4$. Moreover, in the case a=0.08, peak patterns were observed which matched the X-ray diffraction patterns of spinel-type $Fe(Al_{1-x}Mn_x)_2O_4$, $Fe_2O_3$, $FeAl_2O_4$, and MnO. Accordingly, it was confirmed that $Fe_2O_3$, $FeAl_2O_4$, and MnO had been produced other than $Fe(Al_{1-x}Mn_x)_2O_4$.

Figure 5:
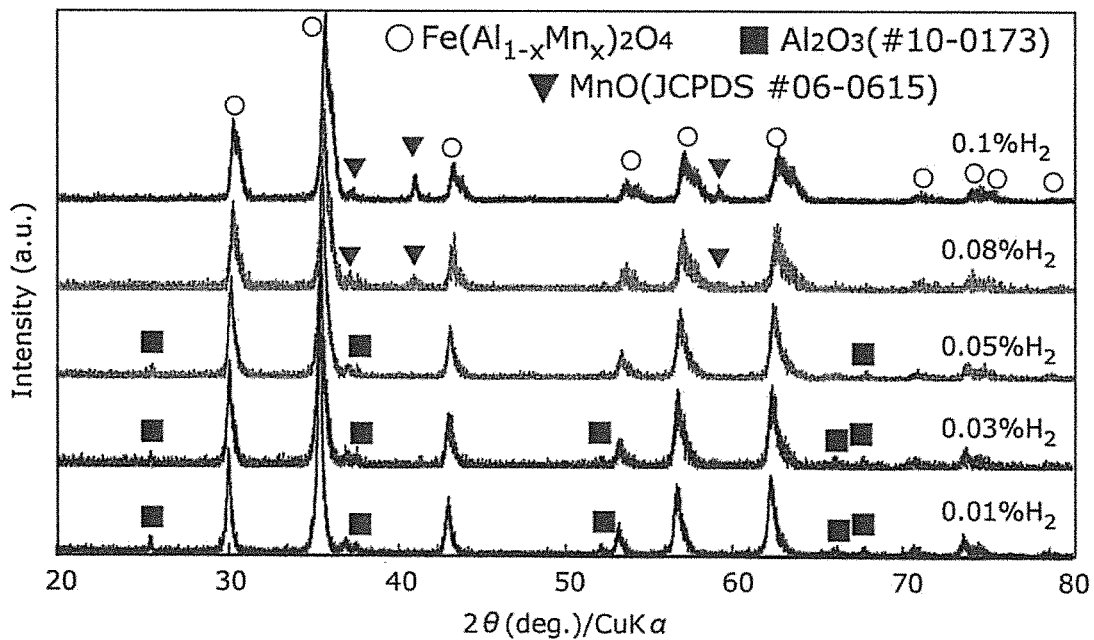
FIG. 5 is a graph illustrating an X-ray diffraction pattern of a product treated with heat under each of various gas atmospheres in the case x=0.5.

In the case x=0.5, $Fe(Al_{1-x}Mn_x)_2O_4$ was synthesized while a rate a % of $H_2$ gas included in $N_2$ gas was being changed as a=0.01, 0.03, 0.05, 0.08, 0.1 in the prebaking step. As illustrated in FIG. 5, in the case a=0.01, 0.03, 0.05, peak patterns were observed which matched the X-ray diffraction patterns of spinel-type $Fe(Al_{1-x}Mn_x)_2O_4$ and $Al_2O_3$. Accordingly, it was confirmed that $Al_2O_3$ had been produced other than $Fe(Al_{1-x}Mn_x)_2O_4$. Moreover, in the case a=0.08, peak patterns were observed which matched the X-ray diffraction patterns of spinel-type $Fe(Al_{1-x}Mn_x)_2O_4$ and MnO. Accordingly, it was confirmed that $Fe(Al_{1-x}Mn_x)_2O_4$ and MnO had been produced. Moreover, in the case a=0.1, peak patterns were observed which matched the X-ray diffraction patterns of spinel-type $Fe(Al_{1-x}Mn_x)_2O_4$ (a theoretical value) and MnO. Accordingly, it was confirmed that $Fe(Al_{1-x}Mn_x)_2O_4$ and MnO had been produced.

In the case x=0.6, $Fe(Al_{1-x}Mn_x)_2O_4$ was produced while a rate a % of $H_2$ gas included in $N_2$ gas was being changed as a=0, 0.01, 0.03, 0.05, 0.08 in the sintering step. As illustrated in FIG. 6, in the case a=0, peak patterns were observed which matched the X-ray diffraction patterns of spinel-type $Fe(Al_{1-x}Mn_x)_2O_4$ and $MnFe_2O_4$. Accordingly, it was confirmed that $MnFe_2O_4$ had been formed other than $Fe(Al_{1-x}Mn_x)_2O_4$. Moreover, in the case a=0.01, a peak pattern was observed which matched the X-ray diffraction pattern of spinel-type $Fe(Al_{1-x}Mn_x)_2O_4$. Accordingly, it was confirmed that $Fe(Al_{1-x}Mn_x)_2O_4$ had been produced.

Moreover, in the case a=0.03, 0.05, 0.08, peak patterns were observed which matched the X-ray diffraction patterns of spinel-type $Fe(Al_{1-x}Mn_x)_2O_4$ and MnO. Accordingly, it was confirmed that $Fe(Al_{1-x}Mn_x)_2O_4$ and MnO had been produced.

In the case x=0.8, $Fe(Al_{1-x}Mn_x)_2O_4$ was produced while a rate a % of $H_2$ gas included in $N_2$ gas was being changed as a=0, 0.01, 0.03, 0.05, 0.08 in the prebaking step. As illustrated in FIG. 7, in the case a=0, 0.01, a peak pattern was observed which matched the X-ray diffraction pattern of spinel-type $Fe(Al_{1-x}Mn_x)_2O_4$. Accordingly, it was confirmed that $Fe(Al_{1-x}Mn_x)_2O_4$ had been formed. Moreover, in the case a=0.03, 0.05, 0.08, peak patterns were observed which matched the X-ray diffraction patterns of spinel-type $Fe(Al_{1-x}Mn_x)_2O_4$ and MnO. Accordingly, it was confirmed that $Fe(Al_{1-x}Mn_x)_2O_4$ and MnO had been produced.

In summarizing the case where only spinel-type $Fe(Al_{1-x}Mn_x)_2O_4$ (single phase) was produced, as illustrated in FIG. 8, the value of x in $Fe(Al_{1-x}Mn_x)_2O_4$ and the rate a % of $H_2$ gas included in $N_2$ gas in the prebaking were set to be (x, a)=(0.2, 0.08), (0.6, 0), (0.7, 0), (0.8, 0), (0.9, 0), the peak pattern was observed which matched the X-ray diffraction pattern of spinel-type $Fe(Al_{1-x}Mn_x)_2O_4$. Accordingly, it was confirmed that $Fe(Al_{1-x}Mn_x)_2O_4$ had been produced. Moreover, in the case (x, a)=(0.2, 0.08), the peak patterns were observed which matched the X-ray diffraction patterns of spinel-type $Fe(Al_{1-x}Mn_x)_2O_4$ and $FeAl_2O_4$. Accordingly, it was confirmed that $FeAl_2O_4$ had been produced other than $Fe(Al_{1-x}Mn_x)_2O_4$. Moreover, in the case (x, a)=(0.9, 0), the peak patterns were observed which matched the X-ray diffraction patterns of spinel-type $Fe(Al_{1-x}Mn_x)_2O_4$ and $MnFe_2O_4$. Accordingly, it was confirmed that $MnFe_2O_4$ had been produced other than $Fe(Al_{1-x}Mn_x)_2O_4$.

FIG. 9A is a table summarizing products when a value of x and a content rate of $H_2$ are changed. It is to be noted that in FIG. 9A, "S" indicates that a compound having a spinel-type crystal structure has been formed. In addition, a shaded cell for combination (x, a) indicates a combination (x, a) for which $Fe(Al_{1-x}Mn_x)_2O_4$ of the spinel type has been confirmed.

In summary, as illustrated in FIG. 9A, it was found that the production of $Fe(Al_{1-x}Mn_x)_2O_4$ of the spinel type had been confirmed in the case (x, a)=(0.2, 0.05), (0.2, 0.08), (0.6, 0), (0.6, 0.01), (0.7, 0), (0.7, 0.01), (0.8, 0), (0.8, 0.01), (0.9, 0), (0.9, 0.01).

It is to be noted that as illustrated in FIG. 9A, although it was not confirmed that $Fe(Al_{1-x}Mn_x)_2O_4$ powder of the spinel type had been produced by merely heat-treating a precursor having a composition of x=0.5 under an atmosphere, it was confirmed that $Fe(Al_{1-x}Mn_x)_2O_4$ of the spinel type had been produced even in the case x=0.5, in the following cases.

Figure 9B:
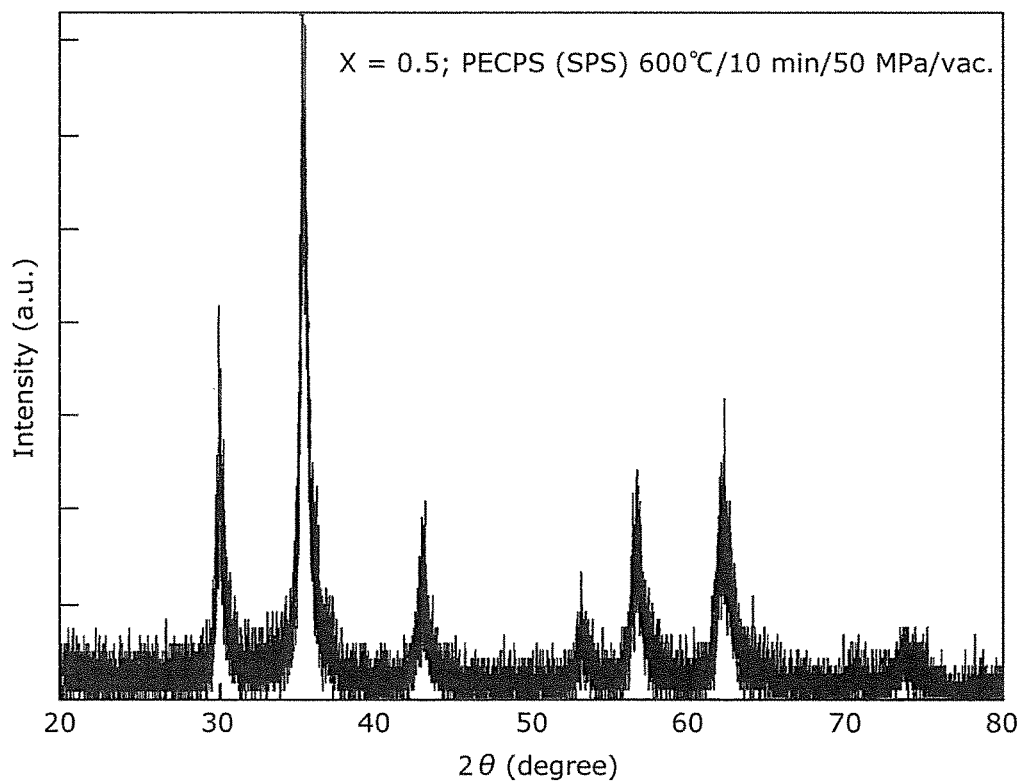
FIG. 9B is a graph illustrating an X-ray diffraction pattern of a product produced by pulsed electric-current pressure sintering in the case x=0.5.
Figure 9C:
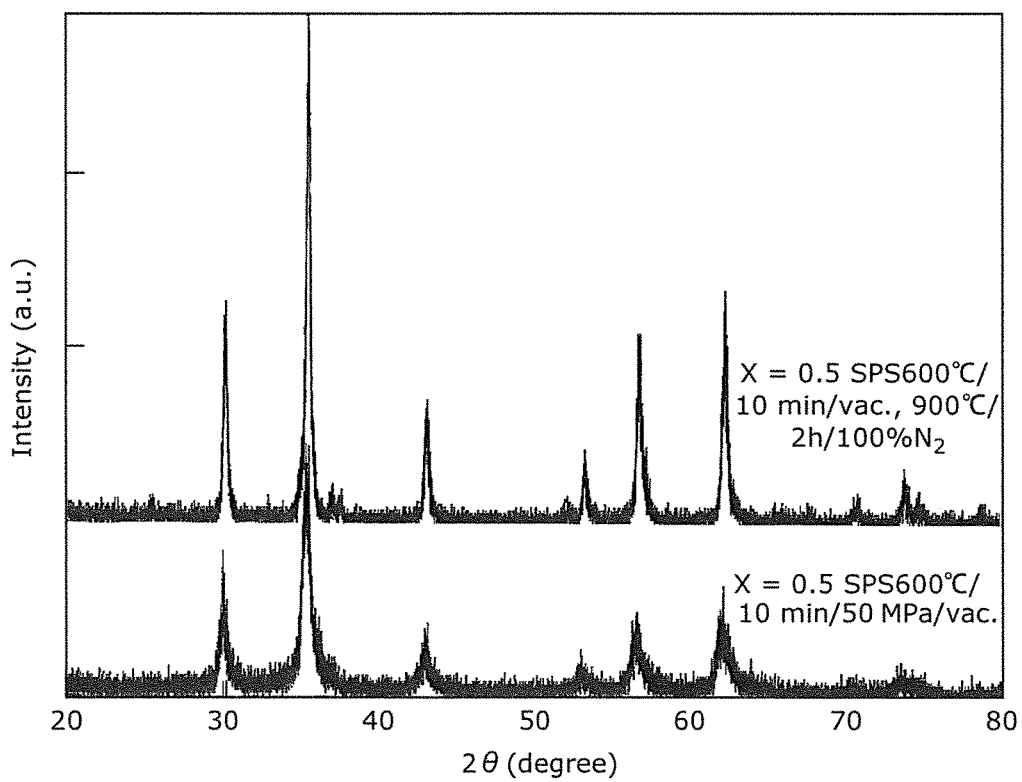
FIG. 9C is a graph illustrating X-ray diffraction patterns of products produced by pulsed electric-current pressure sintering and atmospheric heat treatment in the case x=0.5.
Figure 10A:
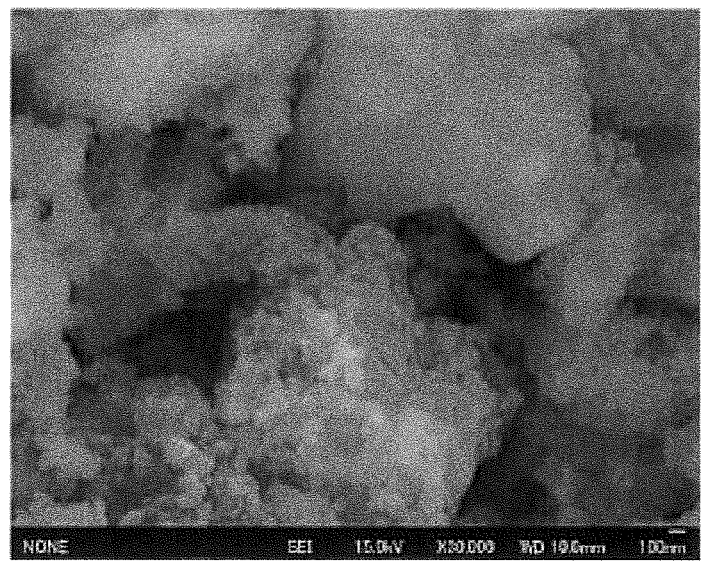
FIG. 10A is a scanning electron microscopy (SEM) photograph of $Fe(Al_{1-x}Mn_x)_2O_4$ powder in the case x=0.
Figure 10B:
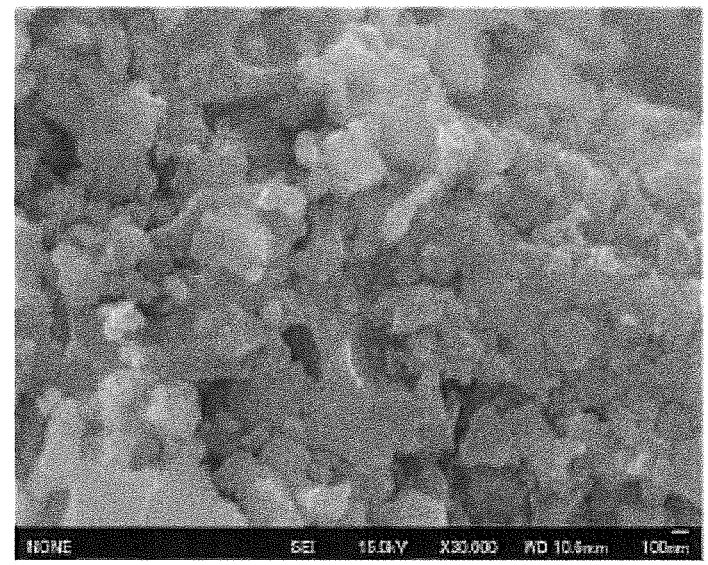
FIG. 10B is an SEM photograph of $Fe(Al_{1-x}Mn_x)_2O_4$ powder in the case x=0.2.
Figure 10C:
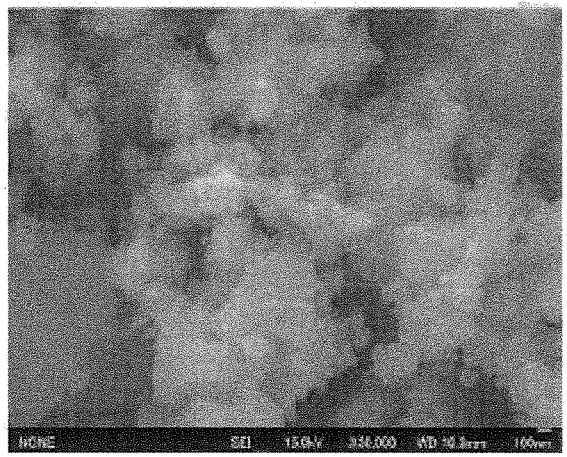
FIG. 10C is an SEM photograph of $Fe(Al_{1-x}Mn_x)_2O_4$ powder in the case x=0.4.
Figure 10D:
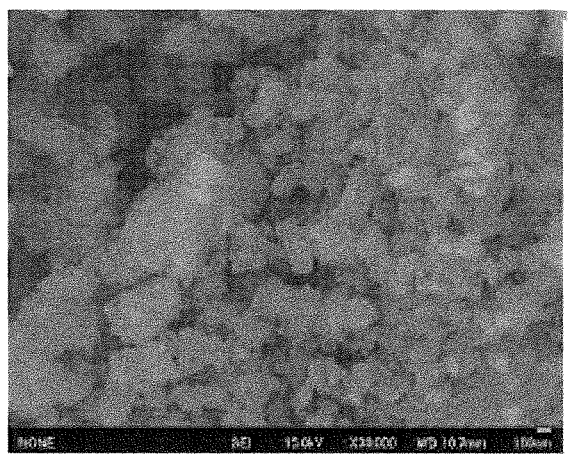
FIG. 10D is an SEM photograph of $Fe(Al_{1-x}Mn_x)_2O_4$ powder in the case x=0.5.
Figure 10E:
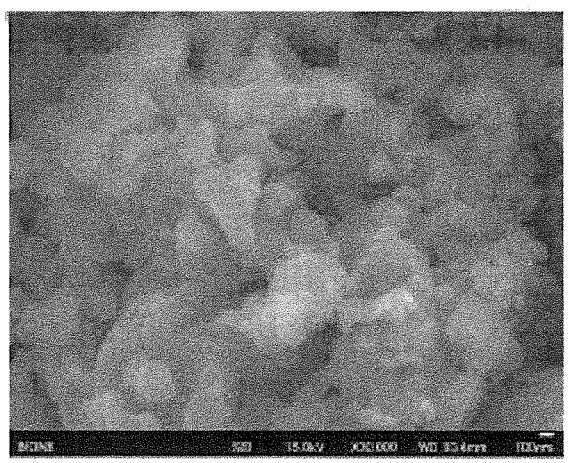
FIG. 10E is an SEM photograph of $Fe(Al_{1-x}Mn_x)_2O_4$ powder in the case x=0.6.
Figure 10F:
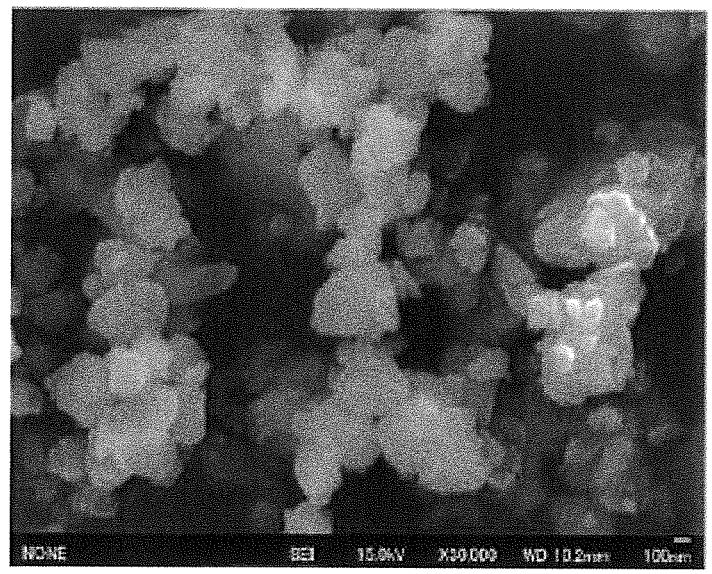
FIG. 10F is an SEM photograph of $Fe(Al_{1-x}Mn_x)_2O_4$ powder in the case x=0.8.
Figure 10G:
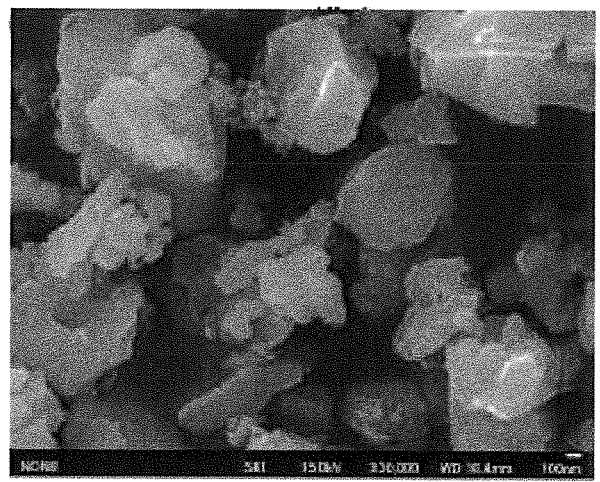
FIG. 10G is an SEM photograph of $Fe(Al_{1-x}Mn_x)_2O_4$ powder in the case x=1.0.

FIG. 9B is a graph illustrating an X-ray diffraction pattern of a product produced by pulsed electric-current pressure sintering (PECPS) in the case x=0.5. FIG. 9C is a graph illustrating X-ray diffraction patterns of products produced by pulsed electric-current pressure sintering and atmospheric heat treatment in the case x=0.5.

In the case x=0.5, a precursor of $Fe(Al_{1-x}Mn_x)_2O_4$ was formed at a pressure of 50 MPa, and further the pulsed electric-current pressure sintering was performed on the precursor under the condition of 600° C./10 minutes/50 MPa/vacuum. An X-ray diffraction pattern of the product at this time was measured, and the X-ray diffraction pattern shown in FIG. 9B was obtained. In the X-ray diffraction pattern shown in FIG. 9B, a peak pattern was observed which matched a diffraction pattern of $Fe(Al_{1-x}Mn_x)_2O_4$ of the spinel type. Accordingly, it was confirmed that $Fe(Al_{1-x}Mn_x)_2O_4$ of the spinel type had been produced. It is to be noted that a sintering method is not limited to the pulsed electric-current pressure sintering, and may be another sintering.

Moreover, $Fe(Al_{1-x}Mn_x)_2O_4$ powder of the spinel type produced by the pulsed electric-current pressure sintering was heat-treated at 900° C. for two hours under the atmosphere. An X-ray diffraction pattern of the product at this time was measured, and the X-ray diffraction pattern shown in FIG. 9C was obtained. It was found that although the X-ray diffraction pattern shown in FIG. 9C had become stronger in XRD than the X-ray diffraction pattern shown in FIG. 9B, part of a crystal phase had been separated. Accordingly, in the case x=0.5, to produce $Fe(Al_{1-x}Mn_x)_2O_4$ powder of the spinel type, it can be said that performing only the PECPS is most suitable.

FIG. 10A to FIG. 10G are scanning electron microscopy (SEM) photographs of agglomerated particles of $Fe(Al_{1-x}Mn_x)_2O_4$ powders in the case x=0, 0.2, 0.4, 0.5, 0.6, 0.8, 1.0. As illustrated in FIG. 10A to FIG. 10G, primary particles included in the agglomerated particles of $Fe(Al_{1-x}Mn_x)_2O_4$ increase in particle diameter with increase in a value of x as in x=0, 0.2, 0.4, 0.5, 0.6, 0.8, 1.0.

Figure 11:
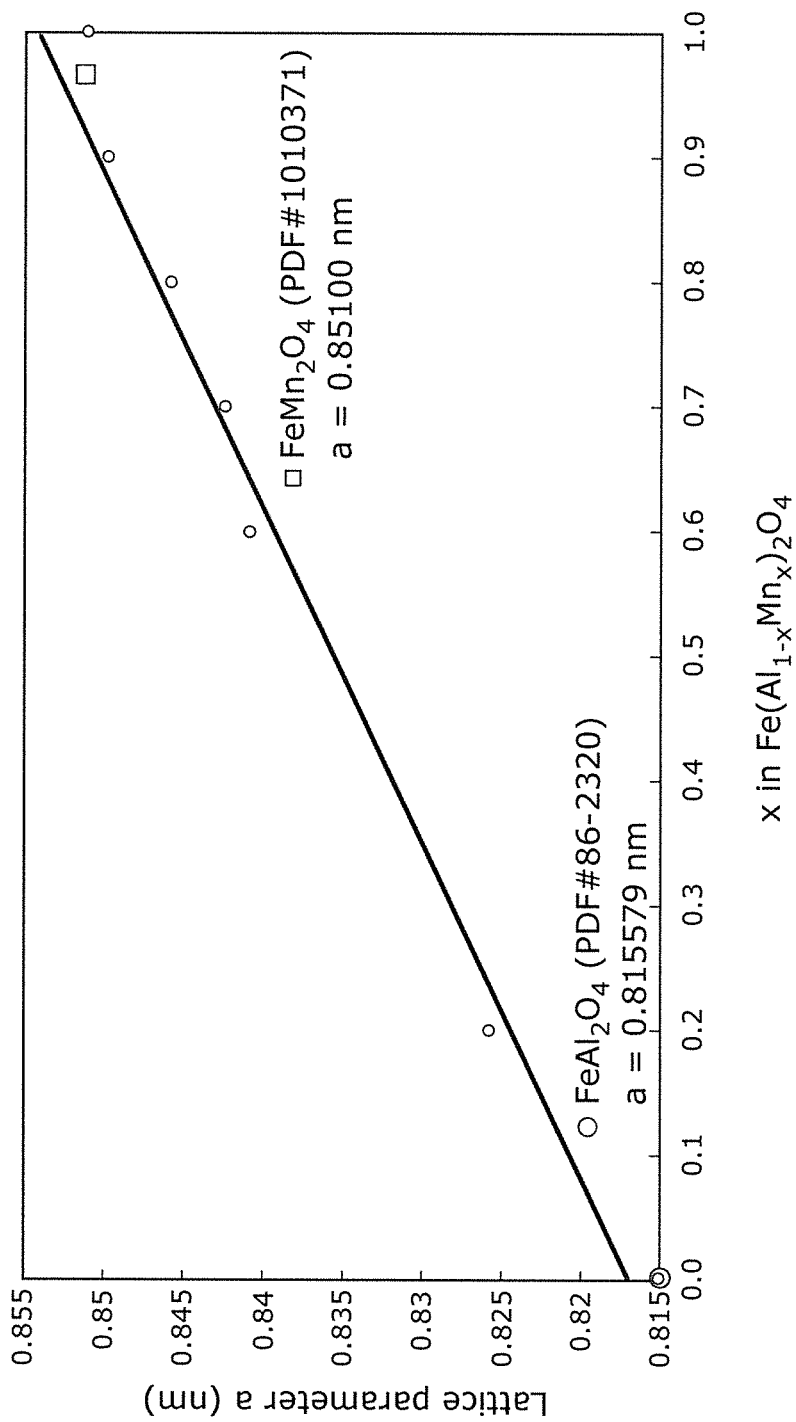
FIG. 11 is a graph illustrating a relationship between a value of x and a lattice parameter of $Fe(Al_{1-x}Mn_x)_2O_4$.

FIG. 11 is a graph illustrating a relationship between a value of x and a lattice parameter of $Fe(Al_{1-x}Mn_x)_2O_4$.

As illustrated in FIG. 11, the lattice parameter of $Fe(Al_{1-x}Mn_x)_2O_4$ increases with increase in the value of x. It can be said that this is consistent with the result that the primary particles increase with increase in the value of x as in x=0, 0.2, 0.4, 0.5, 0.6, 0.8, 1.0 in FIG. 10A to FIG. 10G.

[5. Evaluation of Magnetic Properties of Ferrite $Fe(Al_{1-x}Mn_x)_2O_4$]

Next, magnetic properties of $Fe(Al_{1-x}Mn_x)_2O_4$ will be described.

FIG. 12A to FIG. 12F each are a graph illustrating B—H characteristics of $Fe(Al_{1-x}Mn_x)_2O_4$ in the case x=0, 0.2, 0.6, 0.7, 0.8, 0.9. It is to be noted that although the scales of the vertical axis and horizontal axis are omitted for convenience in FIG. 12A to FIG. 12F, the magnitude of the scales is standardized in FIG. 12A to FIG. 12F.

The B—H characteristics show a change in magnetic flux density (B indicated by the vertical axis) when an external magnetic field (H indicated by the horizontal axis) is applied to a material. The B—H characteristics are represented by a line (proportion) for a paramagnetic substance, and are represented by what is called a hysteresis curve for a ferromagnetic substance. Moreover, a material having a small difference between positive and negative values (coercivity $H_c$) of the external magnetic field H when the magnetic flux density is 0 (a low coercivity $H_c$) in the hysteresis curve is referred to as a soft magnetic material, and a material having a large difference between positive and negative values of the external magnetic field H when the magnetic flux density is 0 (a high coercivity $H_c$) in the hysteresis curve is referred to as a hard magnetic material. A material is magnetized faster by the external magnetic field as the material has a smaller difference between positive and negative values of H (lower coercivity $H_c$). Accordingly, it can be said that a material has more superior magnetic properties as the material is more soft magnetic.

Figure 12A:
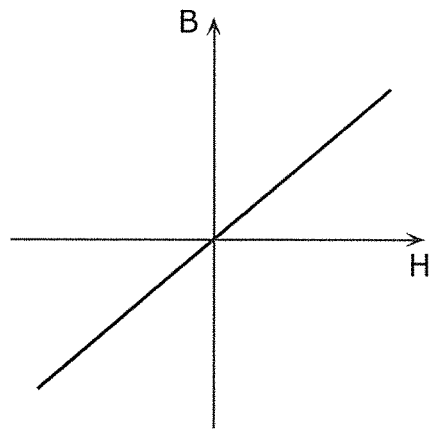
FIG. 12A is a graph illustrating B—H characteristics of $Fe(Al_{1-x}Mn_x)_2O_4$ in the case x=0.

In the case x=0, that is, $FeAl_2O_4$ (hercynite) powder, as illustrated in FIG. 12A, a value of B increases with increase in a value of H, and the B—H characteristics are represented by a line. $FeAl_2O_4$ is a paramagnetic substance, and thus it can be said that the result that the B—H characteristics are represented by the line is reasonable.

Figure 12B:
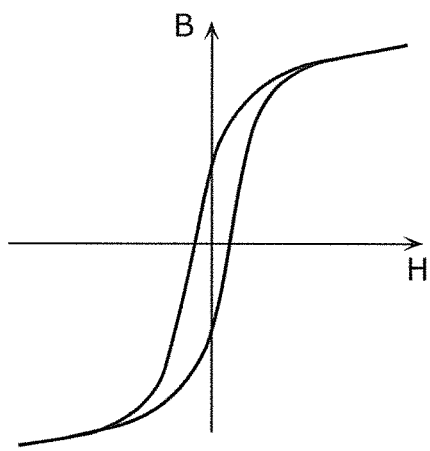
FIG. 12B is a graph illustrating B—H characteristics of $Fe(Al_{1-x}Mn_x)_2O_4$ in the case x=0.2.
Figure 12C:
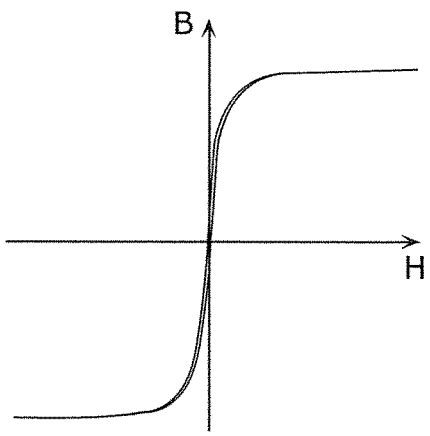
FIG. 12C is a graph illustrating B—H characteristics of $Fe(Al_{1-x}Mn_x)_2O_4$ in the case x=0.6.
Figure 12D:
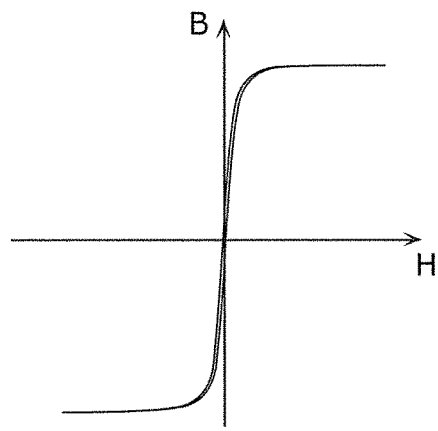
FIG. 12D is a graph illustrating B—H characteristics of $Fe(Al_{1-x}Mn_x)_2O_4$ in the case x=0.7.
Figure 12E:
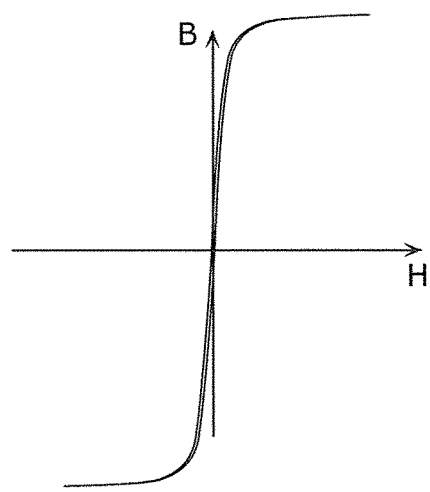
FIG. 12E is a graph illustrating B—H characteristics of $Fe(Al_{1-x}Mn_x)_2O_4$ in the case x=0.8.
Figure 12F:
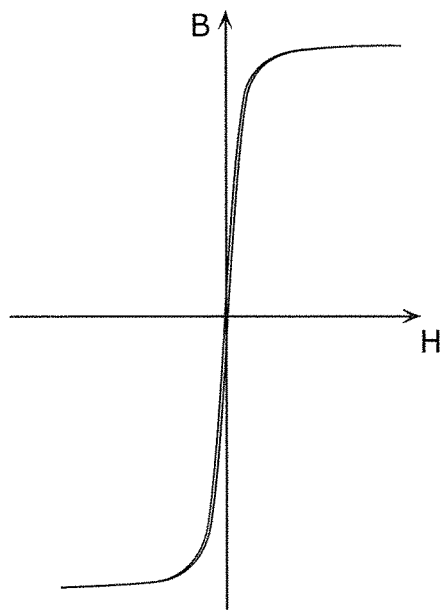
FIG. 12F is a graph illustrating B—H characteristics of $Fe(Al_{1-x}Mn_x)_2O_4$ in the case x=0.9.

Moreover, regarding $Fe(Al_{1-x}Mn_x)_2O_4$ in the case x=0.2, as illustrated in FIG. 12B, the B—H characteristics are represented by a hysteresis curve. Accordingly, it has been found that $Fe(Al_{1-x}Mn_x)_2O_4$ in the case x=0.2 is a ferromagnetic substance. It is to be noted that regarding a range 0<x<0.2 of the value of x, although it is not possible to determine from FIG. 12A and FIG. 12B that $Fe(Al_{1-x}Mn_x)_2O_4$ is a ferromagnetic substance, it can be said from FIG. 12B that $Fe(Al_{1-x}Mn_x)_2O_4$ is a ferromagnetic substance at least in the case x=0.2.

Moreover, regarding $Fe(Al_{1-x}Mn_x)_2O_4$ in the case x=0.6, 0.7, 0.8, 0.9, as illustrated in FIG. 12C to FIG. 12F, the B—H characteristics are represented by a hysteresis curve. Accordingly, it has been found that $Fe(Al_{1-x}Mn_x)_2O_4$ in the case x=0.6, 0.7, 0.8, 0.9 is a ferromagnetic substance.

Moreover, it has been found that a difference between positive and negative values of the external magnetic field H when the magnetic flux density is 0 in the hysteresis curve decreases (the coercivity $H_c$ decreases) with increase in the value of x as in x=0.2, 0.6, 0.7, 0.8, 0.9, and the hysteresis curve indicates the soft magnetism. As a result, it has been found that $Fe(Al_{1-x}Mn_x)_2O_4$ having more superior magnetic properties is obtained as the value of x is greater for $Fe(Al_{1-x}Mn_x)_2O_4$.

It can be said from the above that $Fe(Al_{1-x}Mn_x)_2O_4$ is a ferromagnetic substance in the case x≥0.2.

Figure 13:
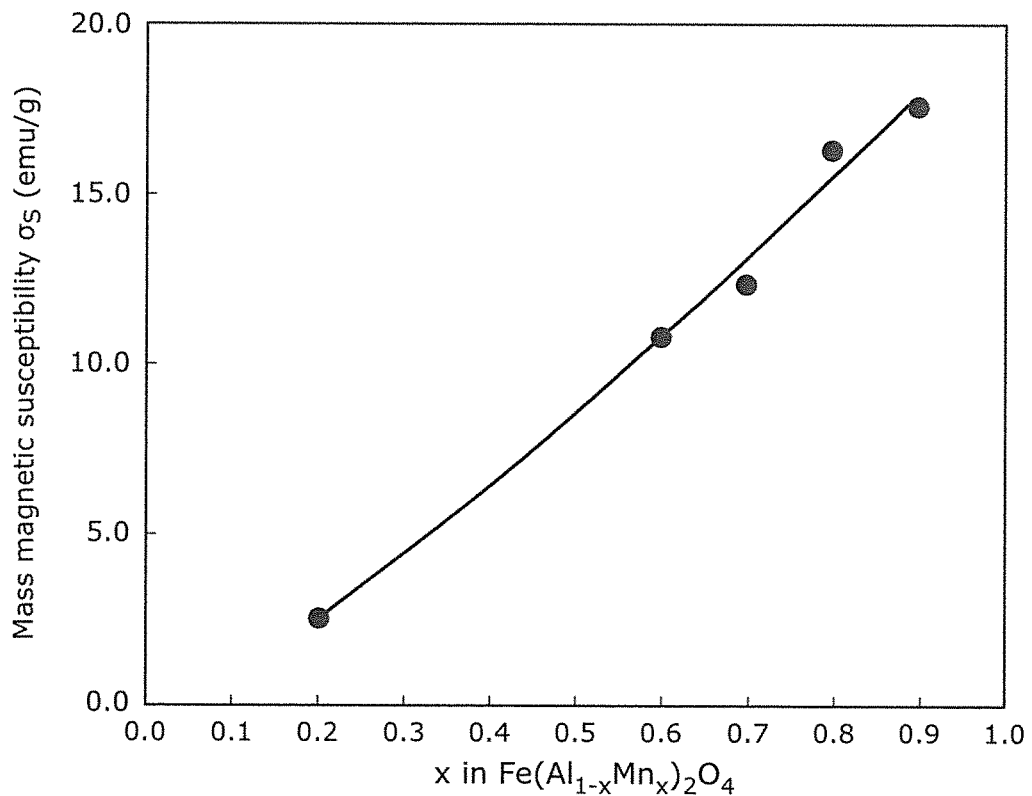
FIG. 13 is a graph illustrating a relationship between a value of x in $Fe(Al_{1-x}Mn_x)_2O_4$ and mass magnetic susceptibility $\sigma_s$.

FIG. 13 is a graph illustrating a relationship between a value of x in $Fe(Al_{1-x}Mn_x)_2O_4$ and a mass magnetic susceptibility $\sigma_s$.

As illustrated in FIG. 13, a value of mass magnetic susceptibility $\sigma_s$ increases with increase in the value of x in $Fe(Al_{1-x}Mn_x)_2O_4$. Consequently, it can be said that $Fe(Al_{1-x}Mn_x)_2O_4$ having more superior magnetization per unit mass is obtained as the value of x is greater. Moreover, when $Fe(Al_{1-x}Mn_x)_2O_4$ is used in a field in which high magnetic properties are needed, especially such as high-frequency devices, it is desirable that $Fe(Al_{1-x}Mn_x)_2O_4$ be a material having superior saturation magnetic flux density. There is a close relationship between saturation magnetic flux density and mass magnetic susceptibility, and it is desirable that mass magnetic susceptibility $\sigma_s$ be expressed as, for example, $\sigma_s \geq 10$. Accordingly, it is desirable that $Fe(Al_{1-x}Mn_x)_2O_4$ whose mass magnetic susceptibility $\sigma_s$ satisfies $\sigma_s \geq 10$ be synthesized.

Figure 14:
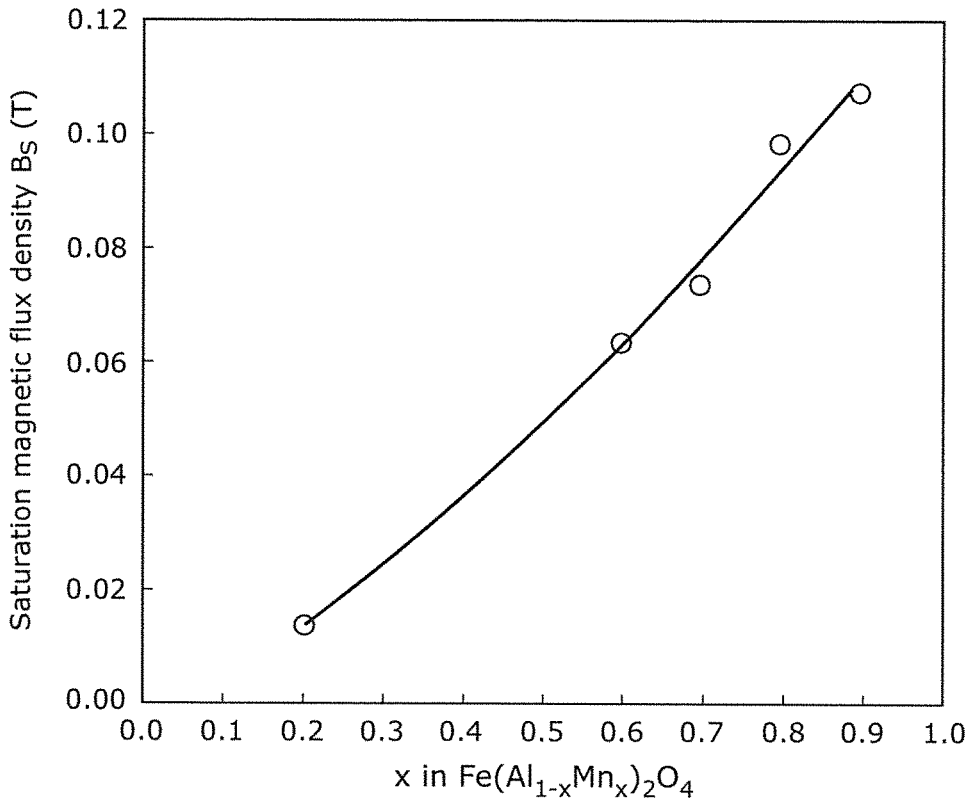
FIG. 14 is a graph illustrating a relationship between a value of x in $Fe(Al_{1-x}Mn_x)_2O_4$ and a saturation magnetic flux density $B_s$.

FIG. 14 is a graph illustrating a relationship between a value of x in $Fe(Al_{1-x}Mn_x)_2O_4$ and a saturation magnetic flux density $B_s$.

As illustrated in FIG. 14, a value of the saturation magnetic flux density $B_s$ increases with increase in the value of x in $Fe(Al_{1-x}Mn_x)_2O_4$. Consequently, it can be said that $Fe(Al_{1-x}Mn_x)_2O_4$ having more superior saturation magnetic flux density $B_s$ as the value of x is greater.

Figures 15, 16:
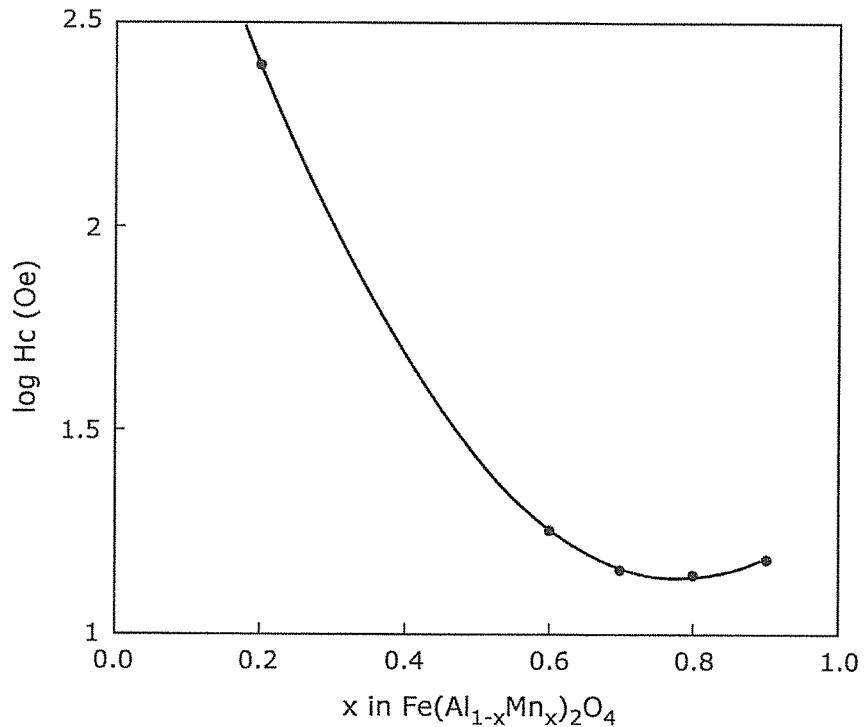
FIG. 15 is a graph illustrating a relationship between a value of x in $Fe(Al_{1-x}Mn_x)_2O_4$ and log $H_c$.
FIG. 16 is a table summarizing a relationship between values of x in $Fe(Al_{1-x}Mn_x)_2O_4$ and magnetic properties.

FIG. 15 is a graph illustrating a relationship between a value of x in $Fe(Al_{1-x}Mn_x)_2O_4$ and a coercivity H. It is to be noted that the coercivity (vertical axis) is represented by a logarithm in FIG. 15.

As illustrated in FIG. 15, the coercivity $H_c$ decreases with increase in the value of x in $Fe(Al_{1-x}Mn_x)_2O_4$. It can be said that this indicates that $Fe(Al_{1-x}Mn_x)_2O_4$ is further soft magnetized with increase in the value of x. The coercivity $H_c$ indicates the minimum value when the value of x is approximately 0.8. The coercivity increases again when the value of x exceeds 0.8. Accordingly, it can be said that when the value of x is approximately 0.8, $Fe(Al_{1-x}Mn_x)_2O_4$ exhibiting the best soft magnetism and having the best coercivity is obtained.

FIG. 16 is a table summarizing a relationship between values of x in $Fe(Al_{1-x}Mn_x)_2O_4$ and structures and magnetic properties of $Fe(Al_{1-x}Mn_x)_2O_4$.

As illustrated in FIG. 16, in the case x=0.2, a $Fe(Al_{1-x}Mn_x)_2O_4$ solid solution was successfully synthesized by the above-described production method for the first time.

Moreover, although a single phase was not obtained by heat treatment at a normal temperature in the case x=0.4 or 0.5, single-phase powder was successfully synthesized by, for example, pulsed electric-current pressure sintering in the case x=0.5. Furthermore, also in the case x=0.6, 0.7, 0.8, 0.9, a $Fe(Al_{1-x}Mn_x)_2O_4$ solid solution was successfully synthesized by the above-described production method for the first time.

As stated, $Fe(Al_{1-x}Mn_x)_2O_4$ produced by the above-described production method is ferrite having a new composition and exhibits ferromagnetism. $Fe(Al_{1-x}Mn_x)_2O_4$ has saturation magnetic flux density $B_s$ in a range of from approximately 0.06 to 0.11 [T] as an example, and coercivity $H_c$ in a range of from 14 to 18 [Oe] as an example. Moreover, it has been evaluated that the value of x in $Fe(Al_{1-x}Mn_x)_2O_4$ when $Fe(Al_{1-x}Mn_x)_2O_4$ has the best magnetic properties is, for example, 0.8, and at this time the saturation magnetic flux density $B_s$ and coercivity $H_c$ are 0.098 [T] and 14 [Oe], respectively.

According to the magnetic material and production method therefor according to the embodiment, because it is possible to place Mn in the same site as the site in which Al of hercynite $FeAl_2O_4$ is placed, it is possible to easily synthesize a ferrite magnetic material expressed by a chemical structure formula $Fe(Al_{1-x}Mn_x)_2O_4$. In consequence, it is possible to provide a ferrite magnetic material $Fe(Al_{1-x}Mn_x)_2O_4$ having high magnetic properties.

Although the magnetic material and production method therefor according to the embodiment of the present disclosure have been described above, the present disclosure is not limited to the embodiment.

For example, a sintering method is not limited to the aforementioned hot pressing, and other methods such as pulsed electric-current pressure sintering may be used. Moreover, the temperatures and times in the aforementioned steps are mere examples, and other temperatures and times may be used.

Moreover, the solution 1a, the solution 1b, and the solution 1c may be mixed at one time, or, for example, a mixed solution obtained by mixing the solution 1b and the solution 1c may be prepared, and the mixed solution may be further mixed with the solution 1a.

Moreover, although $Fe(Al_{1-x}Mn_x)_2O_4$ is synthesized by a liquid phase method in which the solution 1a, the solution 1b, and the solution 1c are mixed in the aforementioned embodiment, $Fe(Al_{1-x}Mn_x)_2O_4$ may be synthesized by the solid phase method.

Moreover, the present disclosure is not limited to the embodiment. Forms obtained by various modifications to the embodiment that can be conceived by a person skilled in the art as well as forms realized by combining structural elements in different embodiments, which are within the scope of the essence of the present disclosure, may be included in the one or more aspects.

INDUSTRIAL APPLICABILITY

A magnetic material according to the present disclosure can be used for inductors for high frequency, magnetic cores for transformers, and the like.

REFERENCE SIGNS LIST 1a solution (mixed aqueous solution)
1b solution (citric acid)
1c solution (ethylene glycol)

The invention claimed is:

1. A magnetic material which is expressed by a chemical structure formula $Fe(Al_{1-x}Mn_x)_2O_4$, where x is $\geq 0.2$ and x is <1, and exhibits ferromagnetism.

2. The magnetic material according to claim 1, wherein a range of a value of mass magnetic susceptibility $\sigma_s$ [emu/g] of the magnetic material is expressed as $\sigma_s \geq 10$.

3. The magnetic material according to claim 1, wherein the magnetic material comprises manganese dioxide $MnO_2$ as a raw material.

4. A production method for a magnetic material, wherein the magnetic material is expressed by a chemical structure formula $Fe(Al_{1-x}Mn_x)_2O_4$, where 0<x<1, and exhibits ferromagnetism,
the production method comprising:
preparing a mixed aqueous solution by dissolving, in distilled water, Fe nitrate, Al nitrate, and an oxide including Mn, the Fe nitrate, the Al nitrate, and the oxide being parent materials;
preparing a metal-citric acid complex by mixing citric acid and ethylene glycol with the mixed aqueous solution;
obtaining a precursor by boiling the metal-citric acid complex to a gel and drying the gel; and
obtaining the magnetic material by sintering the precursor.

5. The production method according to claim 4, wherein, in the obtaining of the magnetic material, a trivalent Fe ion and a tetravalent Mn ion are reduced to a divalent Fe ion and a trivalent Mn ion, respectively.

6. The production method according to claim 4, wherein the Fe nitrate is iron(III) nitrate nonahydrate $Fe(NO_3)_3 \cdot 9H_2O$,
the Al nitrate is aluminum(III) nitrate nonahydrate $Al(NO_3)_2 \cdot 9H_2O$, and
the oxide including Mn is manganese dioxide $MnO_2$.

7. The production method according to claim 4, wherein, in the preparing of the metal-citric acid complex, a molar ratio among a metal ion, the citric acid, and the ethylene glycol in the mixed aqueous solution is 1:3:9.

8. The magnetic material according to claim 2, wherein the magnetic material comprises manganese dioxide $MnO_2$ as a raw material.

9. The production method according to claim 5, wherein the Fe nitrate is iron(III) nitrate nonahydrate $Fe(NO_3)_3 \cdot 9H_2O$,
the Al nitrate is aluminum(III) nitrate nonahydrate $Al(NO_3)_2 \cdot 9H_2O$, and
the oxide including Mn is manganese dioxide $MnO_2$.

10. The production method according to claim 5, wherein, in the preparing of the metal-citric acid complex, a molar ratio among a metal ion, the citric acid, and the ethylene glycol in the mixed aqueous solution is 1:3:9.

11. The production method according to claim 6, wherein, in the preparing of the metal-citric acid complex, a molar ratio among a metal ion, the citric acid, and the ethylene glycol in the mixed aqueous solution is 1:3:9.

12. The production method according to claim 9, wherein, in the preparing of the metal-citric acid complex, a molar ratio among a metal ion, the citric acid, and the ethylene glycol in the mixed aqueous solution is 1:3:9.

* * * * *